May 26, 1953 P. O. PARKS 2,639,926
DOLLY OR TRAILER ASSEMBLY
Filed Dec. 22, 1950 2 Sheets-Sheet 1

INVENTOR.
PURL O. PARKS
BY
Jerome W. Paxton
AGT.

May 26, 1953  P. O. PARKS  2,639,926
DOLLY OR TRAILER ASSEMBLY
Filed Dec. 22, 1950  2 Sheets-Sheet 2
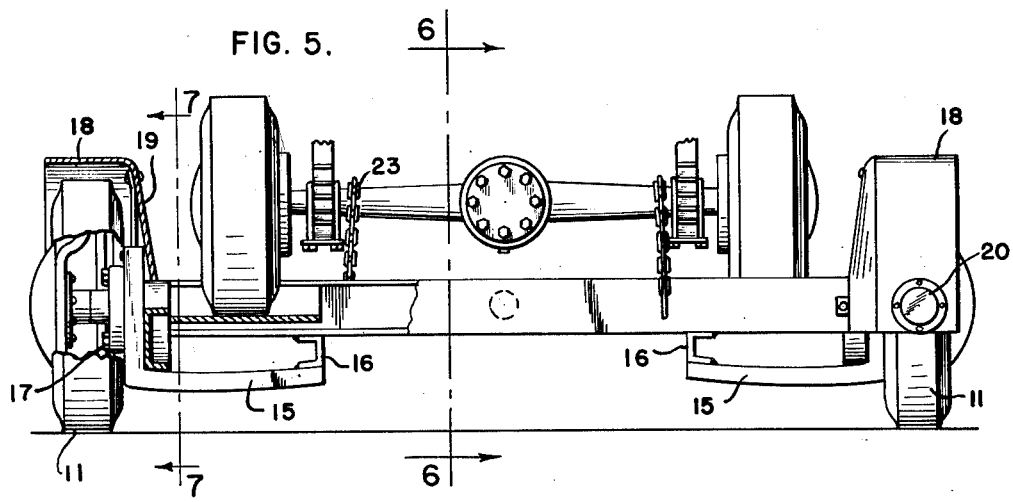
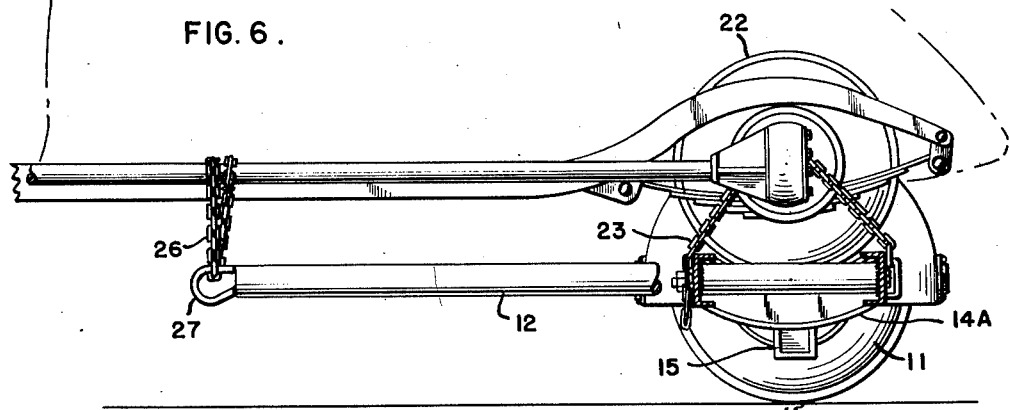
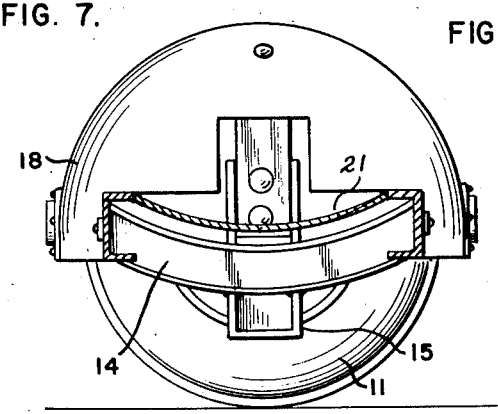
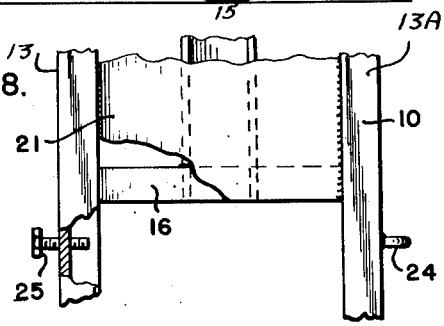
INVENTOR.
PURL O. PARKS
BY Patented May 26, 1953

2,639,926

UNITED STATES PATENT OFFICE 2,639,926

DOLLY OR TRAILER ASSEMBLY

Purl O. Parks, North Liberty, Iowa

Application December 22, 1950, Serial No. 202,370

5 Claims. (Cl. 280—47.15)

1

The present invention relates to a dolly or trailer assembly, and more particularly to a wheeled dolly or trailer finding particular application in the towing of wrecked automobiles.

In many accidents in which a motor vehicle has been involved, it is not possible to tow the wrecked vehicle in the customary procedure of elevating the front wheels by means of a crane located on the wrecking vehicle and by reason of the fact that the gears are often jammed.

An important object of the present invention is to provide a highly mobile dolly which will enable a wrecked automobile to be towed without the vehicle wheels being in contact with the roadway or other surface. More specifically, the present invention comprises a framework having a pair of ground wheels, spaced arcuate supporting surfaces on the framework of such dimensions as to readily accommodate the wheels of a motor vehicle, and a tongue extending forwardly of the framework.

In operation, the wrecking vehicle is moved into close proximity to the vehicle and either the front or rear wheels are elevated by means of the crane. The dolly is then moved beneath the elevated wheels until the arcuate surfaces on the dolly are located beneath the vehicle wheels and the vehicle lowered until the wheels rest in the arcuate surfaces. The tongue on the dolly is then chained or otherwise secured to the vehicle drive shaft, after which the opposite end of the vehicle is then again elevated by means of the crane and the wrecking vehicle can then easily and readily transport the vehicle to the garage.

It can be seen, therefore, that by virtue of the dolly, it is unnecessary to have to place the wrecked vehicle in its entirety on the body of a truck in situations where the gears of the vehicle have been jammed or otherwise injured. In addition, the dolly is especially efficacious in transporting vehicles of the type having hydromatic and fluid drives, due to the fact that to tow a vehicle of this latter type it is first necessary to disconnect the drive shaft.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

2

Figure 5 is a rear view, partly broken away and partly in section of the dolly illustrating the position of the wrecked motor vehicle wheels thereon.

Figure 6 is a sectional view taken along the line 6—6 of Fig. 5, the view looking in the direction of the arrows.

Figure 7 is a sectional view taken along the line 7—7 of Figure 5, the view looking in the direction of the arrows and being on a somewhat larger scale, and Figure 8 is a top plan view partly broken away showing one end of the dolly frame.

Figure 3:
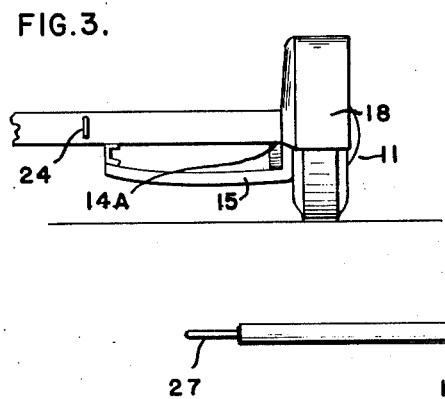
Figures 3 and 4 are fragmental rear and side elevational views of one of the dolly wheels.
Figure 2:
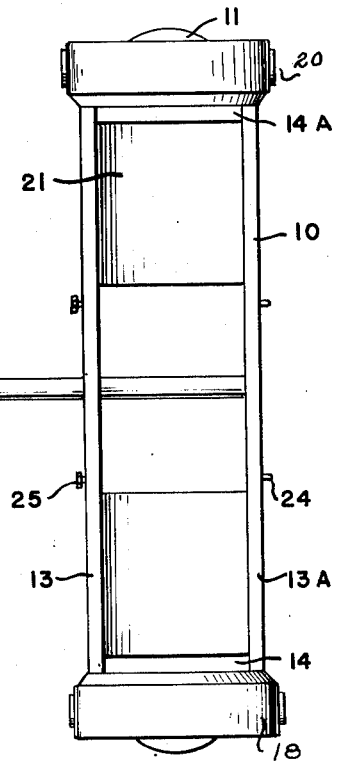
Figure 2 is a top plan view of the dolly.
Figure 4:
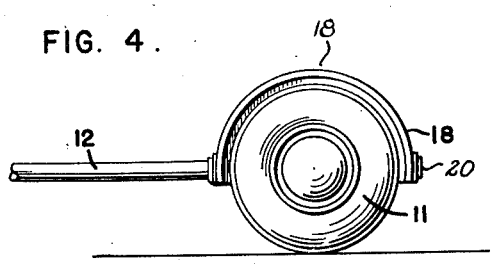

The dolly comprises a substantially rectangular metal frame 10 having a pair of ground wheels 11 at each end thereof, and a tongue 12 extending forwardly of the frame 10, the tongue being secured to the frame at midpoint thereof by suitable means, such as welding or the like. The frame 10 comprises a pair of spaced parallel channel bars 13 and 13A, the ends of the channel bars being connected by means of arcuate end channel bars 14 and 14A in any suitable or convenient manner. A substantially L-shaped channel member 15 is secured to the outer face of each of the channel bars 14 and 14A, and it can be seen in Figures 3 and 5 that the long leg of the channel member 15 extends a substantial distance inwardly of the frame and the inner end of the leg is secured to a bar 16 which, in turn, is welded to the lower flange of each of the channel bars 13 and 13A, as perhaps more clearly shown in Figure 8. Each wheel 11 is bolted to the short leg of the L-shaped channel member 15, as indicated generally at 17, and inasmuch as the wheel structure is conventional, no further description is thought necessary. A fender 18 is suitably attached to the frame 10, and a bracing member 19 is secured to the fender and to the upper flange of the arcuate channel member 14, as indicated in Figure 5. If desired, suitable reflecting surfaces 20 may be carried by the fender adjacent the front and lower ends thereof.

An arcuate metal tread plate 21 of substantial width (to compensate for various types of pneumatic tires) spans the gap between the front and rear channel bars 13 and 13A adjacent each end of the frame 10, and the outer edge of each tread is substantially flush with the arcuate channel members 14 and 14A. The treads 21 are preferably fixed to the channel bars 13 and 13A by welding, although, of course, other conventional securing unions may be employed.

The tongue 12 preferably extends through an opening in the front channel bar 13 and abuts the vertical web of the rear channel bar 13A, and the tongue is welded to the respective channel bars. Hence, it can be seen that the frame 10 is of very sturdy construction and employs relatively few essential working parts. By reason of the simplicity thereof, the unit can be manufactured at a relatively inexpensive cost and presents few, if any, problems from the maintenance point of view.

Figure 1:
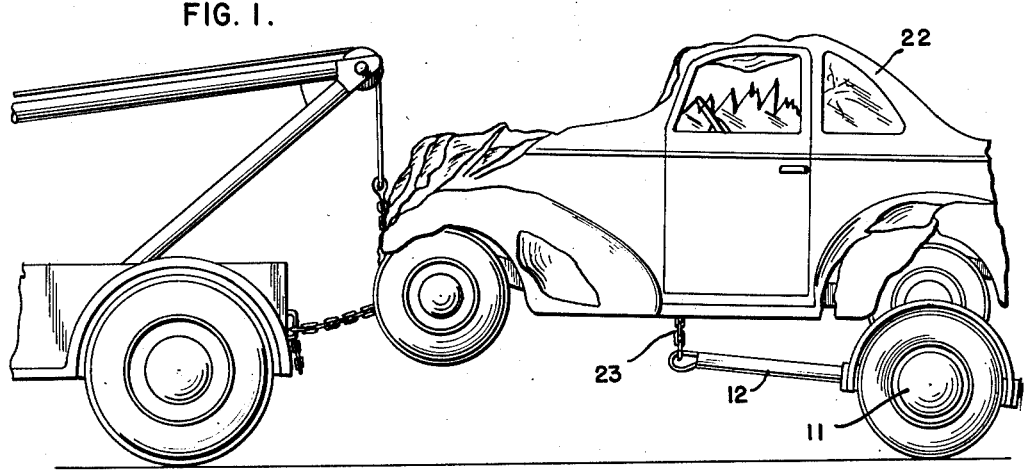
Figure 1 is a view in perspective and partly broken away showing the dolly in operative relation wherein the rear wheels of the wrecked motor vehicle are supported by the dolly.

While it is believed that the operation of the dolly is apparent from the foregoing description, it may be briefly summarized as follows:

Assuming that it is desired to support the rear wheels of a wrecked vehicle, such as shown at 22 in Figure 1, the crane of the wrecking vehicle is attached to the rear of the wrecked vehicle and operated to elevate the vehicle 22 to the desired height. The dolly is then moved to a point where the rear wheels of the vehicle 22 will be above the two treads 21. The vehicle 22 is then lowered onto the dolly and the crane disconnected from the vehicle. The wrecking vehicle is then moved to the front of the motor vehicle 22 and the crane actuated to elevate the front end of the vehicle 22. The rear axle of the wheel 22 is then chained or otherwise secured to the frame 10 by chains 23, the ends of the chains being attached to eyes 24 and threaded bolts 25 on the channel members 13A and 13, respectively. An additional chain 26 is attached to a loop 27 at the front end of the tongue 12 and is wrapped around the drive shaft of the vehicle 22. The wrecked vehicle is now ready to be transported to the garage or other repair shop. It is believed obvious from the foregoing that the dolly can be used with the front wheels, but it is deemed unnecessary to elaborate further.

The invention is not to be confined to any strict conformity with the showing in the drawing but may be changed or modified so long as such changes or modifications mark no material departure from the salient features of the invention as expressed in the appended claims.

I claim:

1. A dolly adapted for use in the transportation of wrecked motor vehicles comprising a frame, said frame including a pair of spaced apart parallel support members, means adjacent the ends of said support members to secure said support members in spaced apart relationship, a bracket carried by each of said last named securing means, a ground wheel journalled on each of said brackets, a tongue secured to at least one of said spaced apart parallel support members and extending forwardly of said support members, an arcuate tread plate spanning the gap between said support members adjacent each end thereof, the ends of each of said arcuate tread plates being anchored to the support members, the said plates being adapted to receive either the front or rear wheels of the motor vehicle, means carried by said spaced apart support members for securing the wheel axle of the motor vehicle to the said frame, and further securing means on said tongue for detachably connecting the tongue to the motor vehicle drive shaft.

2. A dolly as claimed in claim 1 wherein each of said brackets is substantially L-shaped, the horizontal leg of the bracket extending inwardly of the frame, the end of the leg being secured to the frame for reinforcing purposes.

3. A dolly as claimed in claim 1 wherein each of said arcuate tread plates is of greater width than the width of the motor vehicle wheels.

4. A dolly adapted for use in the transportation of wrecked motor vehicles comprising a frame having spaced apart parallel support members, end members maintaining said support members in spaced apart relationship, a ground wheel rotatably carried by each of said end members, a tongue secured to one of said support members and extending perpendicularly with respect to the support members, an arcuate tread plate spanning the gap between the support members for receiving either the front or rear wheels of the motor vehicle, the longitudinal mid point of the arcuate tread plate being coincident to the journal of each wheel to the end member, means on said support members for securing the wheel axle of the motor vehicle to the frame, and further means on the tongue to connect the tongue to the motor vehicle drive shaft whereby the motor vehicle is suspended above the ground.

5. A dolly as defined in and claimed by claim 4 further characterized in that said tread plate is located on the support members inwardly of the ground wheels carried by the end members a sufficient distance to ensure that the motor vehicle will remain in an upright position when the dolly is moving around curves.

PURL O. PARKS.

References Cited in the file of this patent
UNITED STATES PATENTS

| Number | Name | Date |
|---|---|---|
| 1,241,413 | Mosher | Sept. 25, 1917 |
| 1,343,650 | Snyder | June 15, 1920 |
| 2,541,582 | Hawkins | Feb. 13, 1951 |
| 2,556,270 | Groeller | June 12, 1951 |